United States Patent
Tang

(10) Patent No.: US 8,823,217 B2
(45) Date of Patent: Sep. 2, 2014

(54) ONE-TO-MANY WIRELESS ENERGY TRANSMISSION SYSTEM

(75) Inventor: Chi Chiu Tang, Hsinchu (TW)

(73) Assignee: Alpha Microelectronics Corp., Hsinchu (TW)

( * ) Notice: Subject to any disclaimer, the term of this patent is extended or adjusted under 35 U.S.C. 154(b) by 570 days.

(21) Appl. No.: 13/223,309

(22) Filed: Aug. 31, 2011

(65) Prior Publication Data

US 2013/0049480 A1 Feb. 28, 2013

(51) Int. Cl.
*H01F 27/42* (2006.01)

(52) U.S. Cl.
USPC .......................................................... 307/104

(58) Field of Classification Search
USPC .......................................................... 307/104
See application file for complete search history.

(56) References Cited

U.S. PATENT DOCUMENTS

2010/0259110 A1* 10/2010 Kurs et al. ................. 307/104

* cited by examiner

*Primary Examiner* — Robert L. Deberadinis
(74) *Attorney, Agent, or Firm* — Lin & Associates IP, Inc.

(57) ABSTRACT

A one-to-many wireless energy transmission system is provided, including a resonance transmission coil and at least a resonance receiving coil, where the resonance transmission coil has a characteristic dimension covering the area or volume larger than or equal to the total area or volume of all of the at least a resonance receiving coil. The one-to-many wireless energy transmission system can further include at least a controllable off-tune relay coil, which is placed within the work range of the resonance transmission coil. The characteristic dimension, resonance frequency and placement location of the at least a controllable relay coil are adjusted in accordance with the characteristic dimension and resonance frequency of the resonance transmission coil so that each of the at least a resonance receiving coil can receive sufficient transmitted energy uniformly within work range of resonance transmission coil to operate normally without interference with each other.

15 Claims, 13 Drawing Sheets

ONE-TO-MANY WIRELESS ENERGY TRANSMISSION SYSTEM

FIELD OF THE INVENTION

The present invention generally relates to a wireless energy transmission system, and more specifically to a one-to-many wireless energy transmission system, with each of wireless energy receiver within the work range able to work independently without interference with each other.

BACKGROUND OF THE INVENTION

Since Nikola Tesla performed the resonant coil experiments in 1891 and many scientists followed the suit, the working theory and the possibility of using electromagnetic resonant coil for wireless energy transmission have been widely validated. Based on the electromagnetic resonance wireless energy transmission theory, many applications are also developed, such as, resonant transformers, RF battery recharger and RFID system, and so on. These systems have been widely applied to many practical fields.

FIG. 1 shows a schematic view of a conventional one-to-one wireless energy transmission system. As shown in FIG. 1, a transmission driver circuit 102 receives energy from an energy source 101 to drive the coil of a resonance transmission circuit 103. Take the circular transmission coil as example. The characteristic dimension of the coil can be expressed by the radius r. The characteristic dimension of transmission coils of other form can be expressed with other parameters. The transmission coil generates a periodic magnetic field with frequency $f_0$ in the space. A resonance receiving circuit 104 is placed at a distance d from resonance transmission circuit 103. Resonance receiving circuit 104 includes receiving coil tuned to the resonance frequency $f_0$ in order to receive the periodic magnetic field from the space with the optimal coupling efficiency. The received energy, after deducting the loss by a redundant energy consumption circuit 105, is transformed into the energy source for a subsequent energy consumption circuit 106 of resonance receiving circuit 104. To ensure the system applicability and preferred coupling efficiency, both the transmission coil and receiving coil are usually designed with a small dimension so that the magnetic field has a stronger concentration with specific directivity. Furthermore, the transmission coil and the receiving coil have the similar characteristic dimension and have a higher Q value.

As the understanding of electromagnetic wireless energy transmission spreads, more applications or experimental improvements are proposed. For example, much effort is devoted to the development of a one-to-many wireless energy transmission system so that the system can transmit energy wirelessly to a plurality of receivers within a specific working range, such as, 1 meter, to function normally.

However, for a feasible one-to-many wireless energy transmission system, the system must meet the following criteria:
1. The coverage area or volume of generated magnetic field must have a sufficiently large work range to accommodate at least the maximum number of receivers allowed by the system definition.
2. The generated magnetic field must be sufficiently uniform in every direction and point with the work range so that each of the receivers within the work range is able to absorb energy sufficient to maintain functioning normally.
3. Each of the receivers within the work range must be able to function independently and without interference with each other.

To meet the aforementioned criteria, a conventional approach is to create a system based on the conventional one-to-one system shown in FIG. 1 and then increase the transmission energy to generate a more intensive magnetic field. Nevertheless, this approach will incur at least the following problems.

The first problem is the uniformity of the magnetic field. Based on the wireless energy transmission theory, as shown in FIG. 2, an inverse cube law exists between the magnetic field density (B) and the coupling distance (d) along the direction perpendicular to the transmission coil, while an inverse square law exists between the magnetic field density and the coupling distance along the direction parallel to the transmission coil. Both the inverse cube law and the inverse square law indicate that the magnetic field density will decay rapidly as the coupling distance increases. Although the transmission coil and receiving coil with high Q value can attract more magnetic lines passing through the coils, i.e., receiving more energy, the received energy will still decay greatly as the coupling distance increases. That is, the coupling efficiency relies greatly on the coupling distance. In other words, the magnetic field distribution is very non-uniform. In this type of system configuration, the transmission energy must be very large for the receiver with the largest distance defined by the system to receive sufficient minimum received energy defined by the system. On the other hand, when the receiver is located at a distance less than the maximum distance defined by the system, the receiver will receive more energy than the defined minimum energy required to maintain normal functioning. The conventional approach is to design the receiver and related subsequent circuit to function normally when receiving only the defined minimum energy. Alternatively, because the related subsequent circuit of the receiver should not function differently for distances from the transmission coil, the excessive energy received by the receiver will be consumed via voltage clamping circuit or voltage regulator. For the energy efficiency issue, this approach is unnecessary waste of energy, which also lowers the overall efficiency of the system. On the other hand, the need to transmit a large amount of energy will increase the difficulty of transmission circuit design as well as the deployment and operation costs.

The second problem is related to the directivity of the magnetic field. Based on the wireless energy transmission theory, for a point with distance d from the physical center of the transmission coil, an inverse square law exists between the magnetic field density (B) and the characteristic dimension (r) of the transmission coil in the direction perpendicular to the transmission coil, while a positive proportional law exists between the magnetic field density (B) and the characteristic dimension (r) of the transmission coil in the direction parallel to the transmission coil. In other words, the transmission coil with a smaller characteristic dimension r will have a higher magnetic field dimension in the direction perpendicular to the transmission coil and a lower magnetic field dimension in the direction parallel to the transmission coil. That is, the transmission coil is more directional. This does not meet the aforementioned criteria because if all of the receivers must be located in the same direction with respect to the transmission coil, the receivers closer to the transmission coil will absorb a larger portion of the energy and prevent the receivers located further from receiving sufficient energy.

The third problem is related to the stability issue. For conventional one-to-one wireless energy transmission system, the design principle is to have transmission and resonance receiving circuits with high Q values so that the resonance receiving circuit can absorb as much transmitted energy as possible. However, if two receivers with high Q values are placed within the work range of a one-to-many wireless transmission system, these two receivers will compete for energy absorption, which leads to unstable operation. The usual outcome will be the receiver placed closer to the transmitter absorbs almost all the transmitted energy while the receiver placed further from the transmitter will absorb almost nothing. In other words, the receivers will interfere with each other. If more receivers are placed within the work range, the situation will become very complicated and some of the receivers may not be able to function because of other receivers. Hence, the design of making each of receivers having high Q value is only applicable to one-to-one transmission system, but not to one-to-many transmission system.

Therefore, the one-to-many wireless energy transmission system cannot be treated as a simple direct extension of a one-to-one wireless energy transmission system. The design of a stable one-to-many wireless energy transmission system is an important issue as well as the foundation of many more applications.

SUMMARY OF THE INVENTION

The primary object of the present invention is to provide a one-to-many wireless energy transmission system so that each of a plurality of wireless energy receivers within the work range of the system can receive sufficient energy to maintain the receiver and related subsequent circuit for normal function.

Another object of the present invention is to provide a one-to-many wireless energy transmission system so that a uniform and sufficient magnetic field can be generated within the work range of the system at any location and direction. In this manner, each of a plurality of wireless energy receivers within the work range of the system can receive sufficient energy regardless of location or direction.

Yet another object of the present invention is to provide a one-to-many wireless energy transmission system so that the magnetic field of the work range of the system must be able to accommodate the maximum number of receivers defined in the system.

To achieve the aforementioned objects, the present invention provides a one-to-many wireless energy transmission system, including a resonance transmission coil and at least a resonance receiving coil, where the resonance transmission coil has a characteristic dimension covering the area or volume larger than or equal to the total area or volume of all of the at least a resonance receiving coil. The one-to-many wireless energy transmission system of the present invention can further include at least a controllable off-tune relay coil. The at least a controllable relay coil is placed within the work range of the resonance transmission coil, and the characteristic dimension, resonance frequency and placement location of the at least a controllable relay coil are adjusted in accordance with the characteristic dimension and resonance frequency of the resonance transmission coil so that each of the at least a resonance receiving coil can receive sufficient transmitted energy uniformly within the work range of the resonance transmission coil in order to operate normally without interference with each other.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
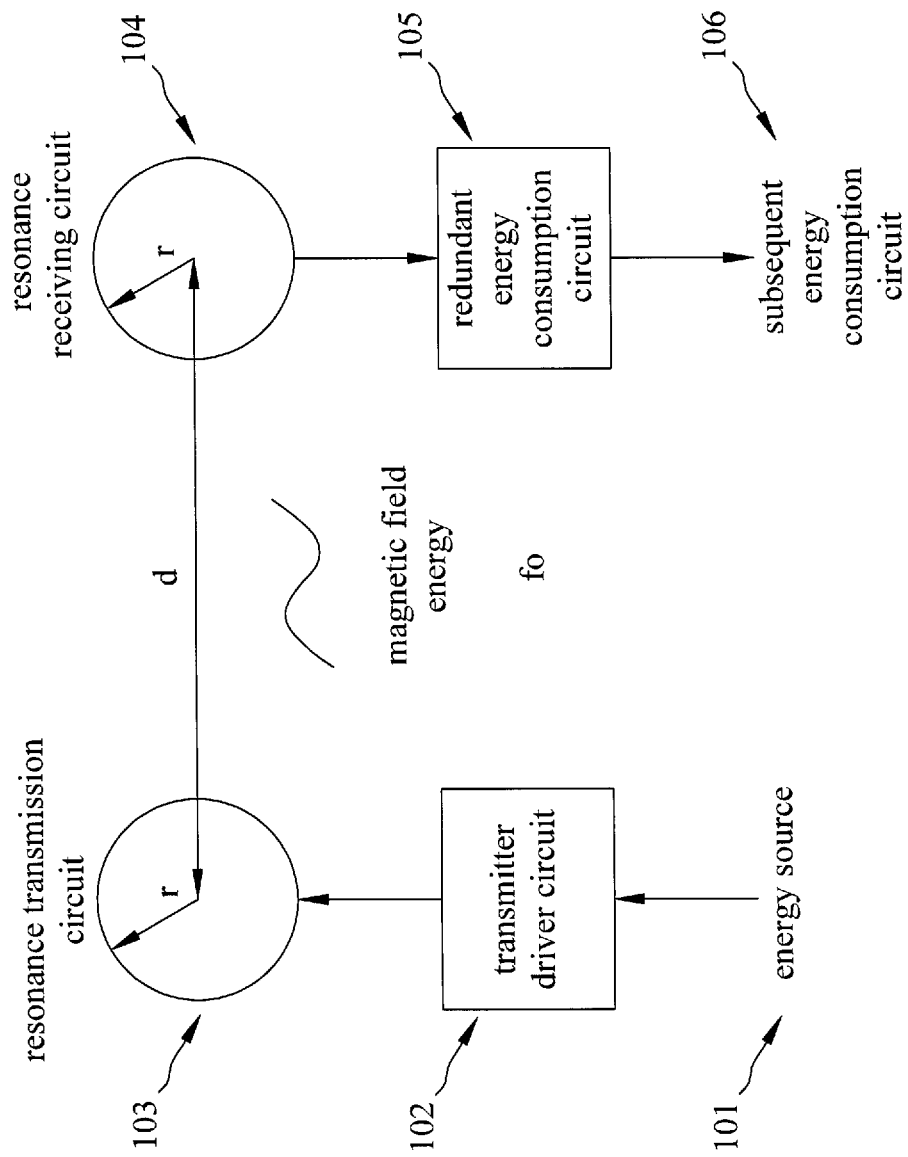
FIG. 1 shows a schematic view of a block diagram of a conventional one-to-one wireless energy transmission system.
Figure 2:
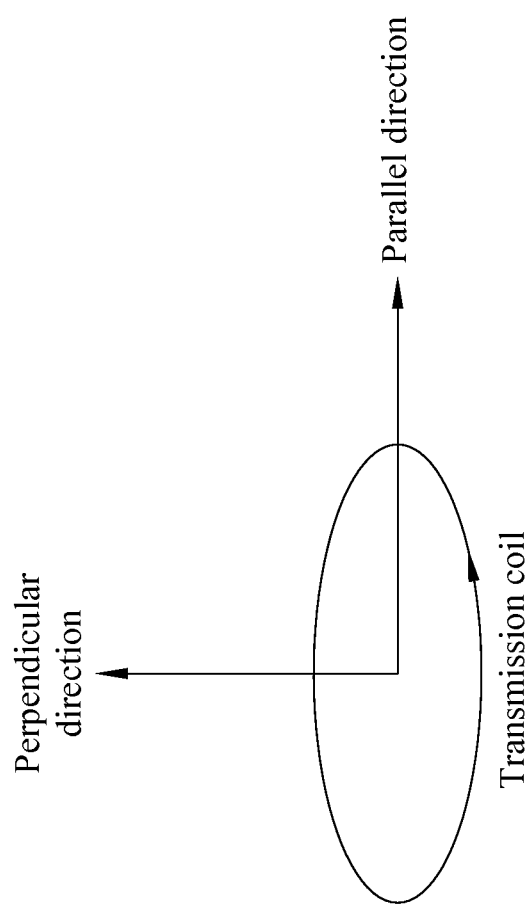
FIG. 2 shows a schematic view of the direction of a magnetic field generated by a transmission coil.
Figure 3:
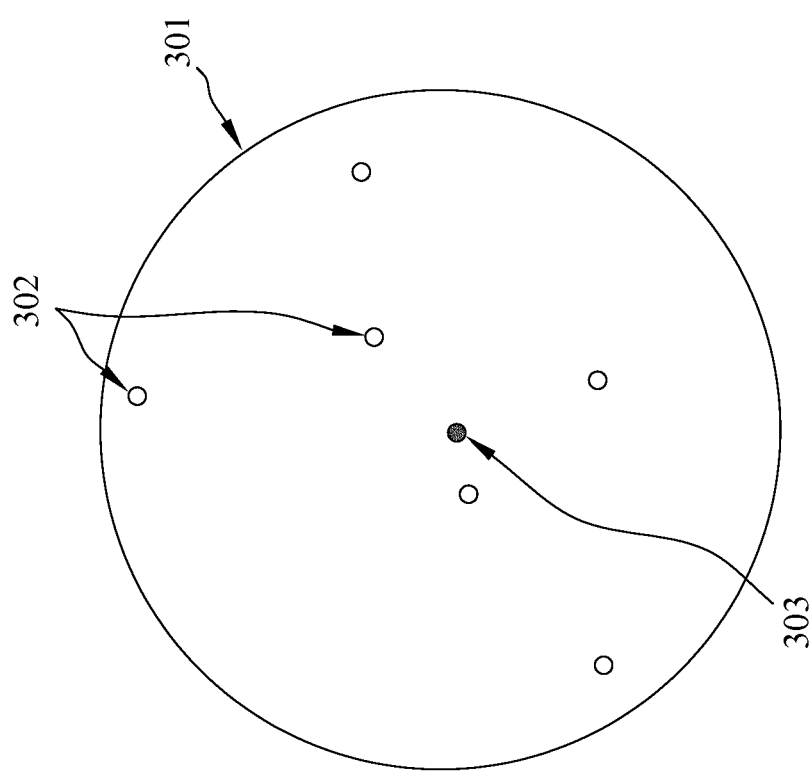
FIG. 3 shows a schematic view of a one-to-many wireless energy transmission system according to the present invention.

FIG. 3 shows a schematic view of a one-to-many wireless energy transmission system according to the present invention. The system includes a resonance transmission coil 301 and at least a resonance receiving coil 302. Point 303 indicates the center of resonance transmission coil 301. Resonance transmission coil has a resonance frequency, and uses a characteristic dimension to indicate a work range. The work range must cover an area or volume larger than or equal to the total area or volume of all of the at least a resonance receiving coil 302. The magnetic field density within the work range of resonance transmission coil 301 shows good uniformity so that each of at least a resonance receiving coil 302, regardless of the location within the work range of resonance transmission coil 301, can uniformly receive a minimum required energy to function normally and without interfering each other. It is worth noting that resonance transmission coil 301 and resonance receiving coil 302 in this embodiment are both circular with characteristic dimensions expressed with a radius r. Other shapes of coils can also be used and expressed with other parameters. The following description of the magnetic field density is also applicable to other shapes of coils.

The features and design principles of the present invention are described respectively as follows. First, based on the magnetic field theory, the following describes the design of the resonance coil to generate a high uniform magnetic field and work range for the one-to-many wireless energy transmission system of the present invention.

A conductive wire carrying a current can generate a magnetic field around the conductive wire. Assume an infinite conduct wire with current I. The generated magnetic field density (B) at the location with distance d from the conductive wire can be expressed as:

$$B = uI/2\pi d = K/d$$

where the unit of magnetic field density is weber/m², and $K = uI/2\pi$, $u = 4\pi \ast (10)^{\wedge}(-7)$ is the magnetic permeability.

Figure 4:
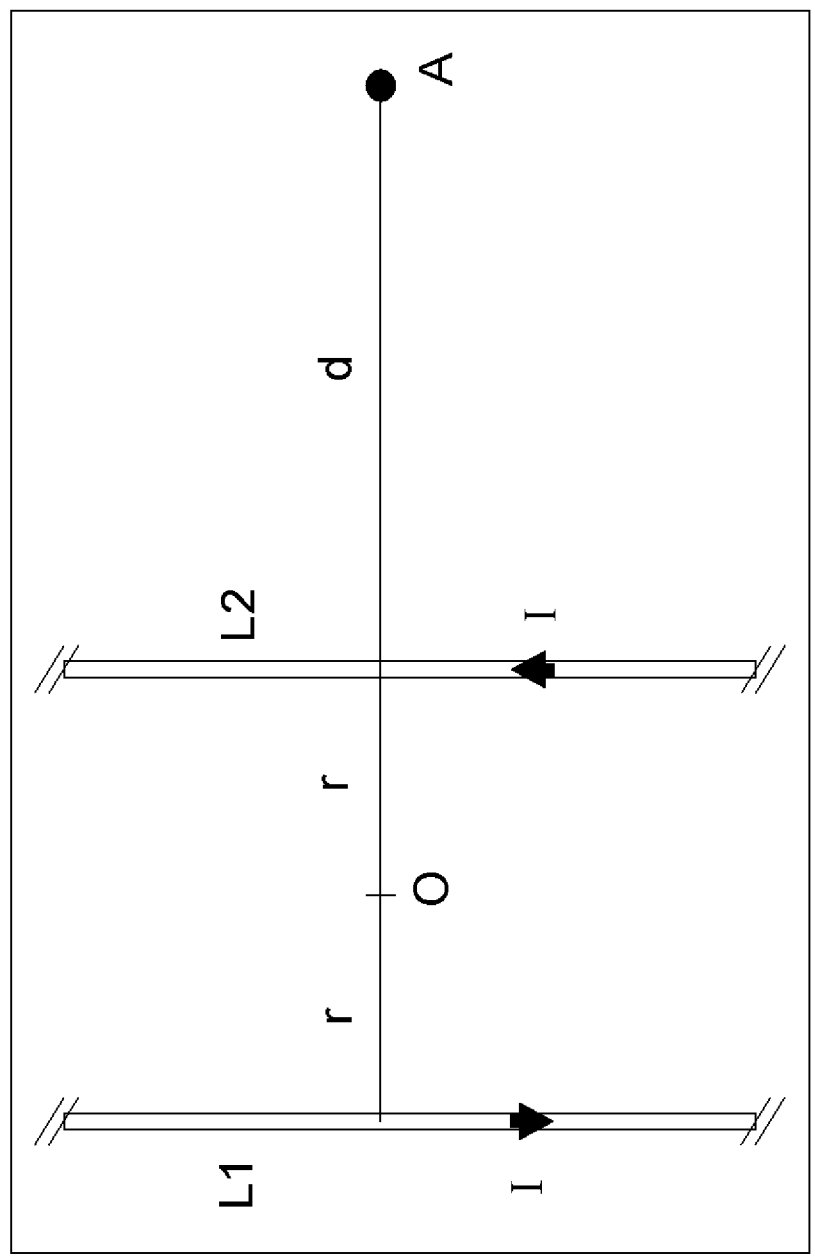
FIG. 4 shows a schematic view of the additive relation of magnetic fields for area outside of two conductive wires.
Figure 5:
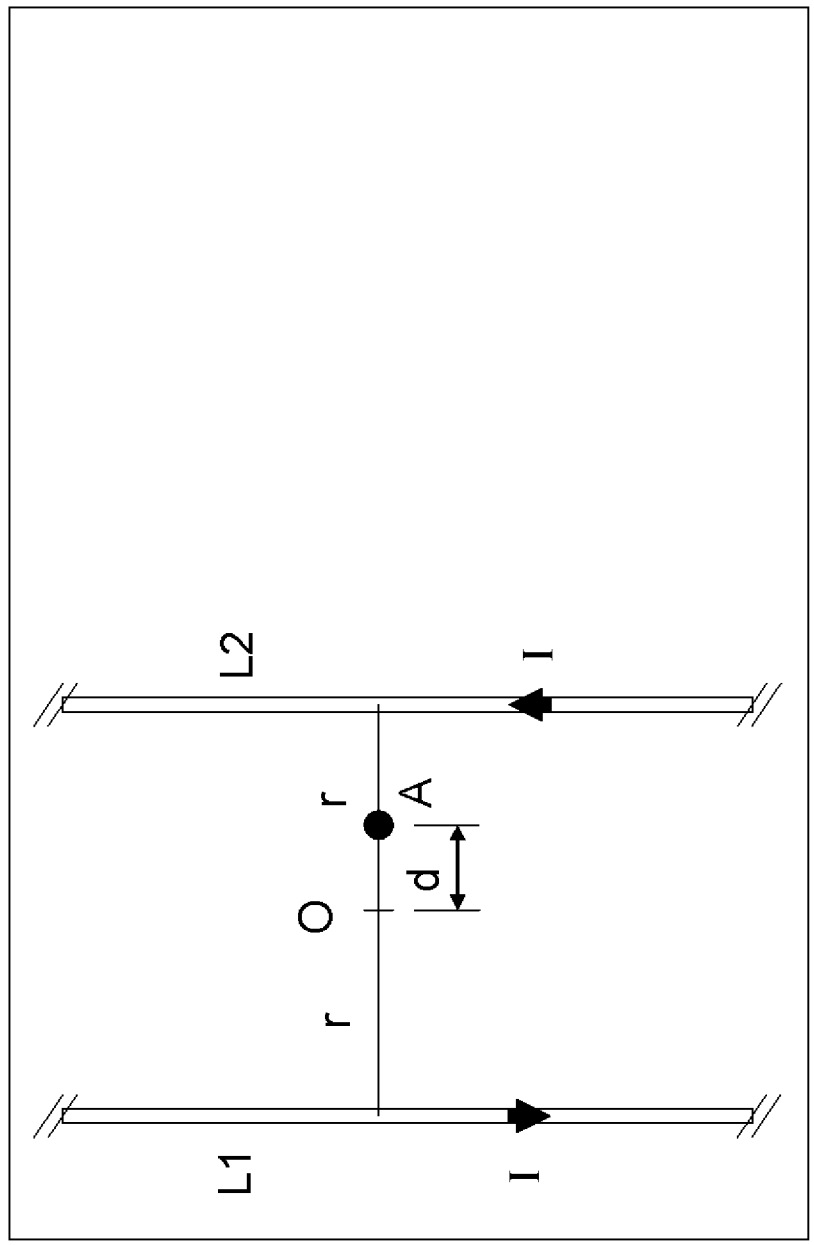
FIG. 5 shows a schematic view of the additive relation of magnetic fields for area between two conductive wires.

FIG. 4 and FIG. 5 further show additive relation of overlapping magnetic fields. As shown in FIG. 4, assume that two infinite wires L1 and L2 of the transmission coil carry current I in opposite direction. Wires L1 and L2 are placed on the opposite side of a center point O, with distance r from point O. That is, the actual distance between the two wires is 2r. Assume that an observation point A is located at a distance d from point O. Based on additive theory of magnetic field:

$$B_a = B_{1a} + B_{2a}$$

where $B_{1a}$ is the magnetic field density at point A generated by wire L1, and $B_{2a}$ is the magnetic field density at point A generated by wire L2.

Because observation point A is located on the same side of the two wires and the currents in the two wires are opposite, the directions of $B_{1a}$ and $B_{2a}$ are opposite in direction according to the Fleming's right-hand rule; thus, $B_{1a}$ and $B_{2a}$ will partially annihilate each other. In other words, $$\begin{aligned} B_a &= B_{1a} + B_{2a} \\ &= K/(d-r) - K/(d+r) \\ &= K(d+r-d+r)/(d-r)(d+r) \\ &= K \times 2r/(d^2 - r^2) \end{aligned} \qquad (1)$$

Assume that $d = n \times r$, and $n \neq 1$ (when $n=1$, point A is located on a wire and the magnetic field density is undefined), then, $$\begin{aligned} B_a &= K \times 2r/(n^2 - 1)r^2 \\ &= K \times 2/(n^2 - 1)r \end{aligned} \qquad (2)$$

When $n \gg 1$, equation (2) can be simplified as:

$$B_a = K \times 2/n^2 r \qquad (3)$$

As seen in equation (3), an inverse square law exists between the decay of the magnetic field density (B) and the distance from the wire.

FIG. 5 shows a schematic view of the scenario when observation point A is located between wires L1 and L2. Similarly, the additive theory of magnetic field shows that:

$$B_a = B_{1a} + B_{2a}$$

where $B_{1a}$ is the magnetic field density at point A generated by wire L1, and $B_{2a}$ is the magnetic field density at point A generated by wire L2.

Because observation point A is located between the two wires and the currents on the two wires are opposite, the direction of $B_{1a}$ and $B_{2a}$ are the same in direction according to the Fleming's right-hand rule; thus, $B_{1a}$ and $B_{2a}$ will be additive. In other words, $$\begin{aligned} B_a &= B_{1a} + B_{2a} \\ &= K/(r-d) + K/(r+d) \\ &= K(r+d+r-d)/(r-d)(r+d) \\ &= K \times 2r/(r^2 - d^2) \\ &= -K \times 2r/(d^2 - r^2) \end{aligned}$$

Considering only the magnitude, but not the direction, the "−" sign can be removed:

$$B_a = K \times 2r/(d^2 - r^2)$$

The result is identical to the aforementioned equation (1).

Assume that $d = r/n$, and $n \neq 1$ (when $n=1$, point A is located on a wire and the magnetic field density is undefined), then $$\begin{aligned} B_a &= (K \times 2r)/((1/n^2 - 1)r^2) \\ &= (K \times 2r)/((1/n^2 - 1)r^2) \end{aligned} \qquad (4)$$

When n approaches infinity, $1/n^2 = 0$. However, in reality, when A is infinite, observation point A is located on point A. $B_a$ is minimum at this location, and $$B_a = -K \times 2/r$$

Considering only the magnitude, but not the direction, the "−" sign can be removed:

$$B_a = K \times 2r/(d^2 - r^2) \qquad (5)$$

As seen in equation (5), an inverse law exists between the decay of the magnetic field density (B) and the distance from the wire for the area between the two wires.

Figure 6:
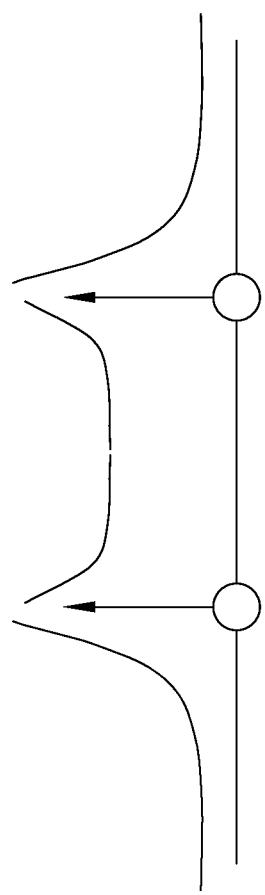
FIG. 6 shows a schematic view of the relation between magnetic field density and the distance from transmission coil.

Comparing equations (3) and (5), it can be seen that the decay rate of the magnetic field between the two wires (i.e., within the transmission coil) is much slower than the decay rate outside of the two wires (i.e., outside of the transmission coil) with respect to the distance. FIG. 6 shows a schematic view of the magnetic field density with respect to the distance from the transmission coil, wherein the two circles indicate the locations of the transmission coil, the x-axis is the distance to the transmission coil and the y-axis is the magnetic field density.

For example, if observation point A is located outside of transmission coil (as shown in FIG. 4) and $n=3$, then, $$B_a = K \times 2/8r = K/4r \qquad (6)$$

On the other hand, if wire L2 of FIG. 5 is placed at the observation point A of FIGS. 4 and R=3r, and wire L1 is placed at the location on the other side of point O with distance 3r from point A, the magnetic field of point A can be expressed as:

$$B_a = K \times 2/3r = 2K/3r \qquad (7)$$

As seen in equations (6) and (7), the magnetic field density within the transmission coil (as in FIG. 5) is stronger than the magnetic field outside of transmission coil (as in FIG. 4).

The conclusion from the above analysis shows that a transmission coil with sufficiently large characteristic dimension to cover and support an entire work range will result in better uniformity in magnetic field density of the work range. In other words, a smaller amount of transmission energy can be used to maintain the magnetic field at the minimum density point in the work range to stay above the minimum required strength so that the receivers within the work range can receive at least minimum required energy to function normally. Of course, another conclusion of the above analysis is that the transmission coil must have a coverage of work range, either in area or volume, larger than the total area or volume of all the receivers so that each of the receivers are covered within the work range.

The above description uses two infinite conductive wires as example to show the magnetic field distribution inside and outside of the transmission coil. For those with ordinary skill of the technology can easily infer that similar results can be obtained regardless the shape of the transmission coils, such as, circular, rectangular, or otherwise.

An additional advantage can be obtained when using a transmission coil with larger characteristic dimension. That is, the larger transmission coil is more suitable to three-dimensional magnetic field applications. In fact, the magnetic field decays faster in the parallel direction as the distance increases for a smaller transmission coil than for a larger transmission coil. The reason is not the smaller transmission coil will consume the energy or suffers energy loss. The reason lies in that the smaller transmission coil will generate a much larger magnetic field in the perpendicular direction. Conventionally, it is know that the magnetic field along the direction perpendicular to the transmission coil shows the following relation between the magnetic field density (B) and distance (d):

$$B = \frac{\mu_0 \times I \times N \times r^2}{2\sqrt{(r^2 + d^2)^3}} = \frac{\mu_0 \times I \times N}{2\frac{1}{\sqrt{\frac{r^6 + 2r^4 d^2 + 2r^2 d^4 + d^6}{r^4}}}}$$

Where $\mu_0$ is the vacuum permeability, also called magnetic constant, I is the current, N is the number of coil rounds, r is the characteristic dimension. Hence, if $d = k \times r$, then $$B = \frac{\mu_0 \times I \times N}{2\frac{1}{r \times \sqrt{2k^2 + 2k^4 + k^6}}}$$

Because B and r are inverse proportional, the smaller r is, the larger B will be. Therefore, a smaller transmission coil shows stronger magnetic direction in the perpendicular direction and less uniform. Conversely, a larger transmission coil shows a weaker perpendicular magnetic field but more uniform.

The one-to-many wireless energy transmission system of the present invention can further include at least a controllable off tune relay coil to enhance the magnetic field uniformity within the work range. A convention relay coil is a high Q-value parallel circuit comprising only a coil and a capacitor, without any energy-consuming load, and the resonance frequency of a conventional relay coil is tuned to the same as the transmission coil. The conventional relay coil technology is widely applied to wireless energy transmission to re-attract and re-concentrate the scattered magnetic field due to the distance. Because the relay coil has high Q-value, in theory, the relay coil can attract more magnetic flux at a further distance than a receiver with low Q-value and load. Because the relay coil does not include an energy-consuming load, the re-attracted and re-concentrated magnetic field energy will not be consumed by the relay coil. Thus, the receivers that cannot absorb sufficient energy due to the location and low Q-value can be placed near the relay coil to receive more energy.

However, the relay coil used in the present invention is different from the conventional relay coil. The relay coil of the present invention has a resonance frequency that is close to the frequency of the transmission coil, but not identical. The main function of the relay coil of the present invention is to enhance the uniformity of the magnetic field generated by the transmission coil.

Figure 7:
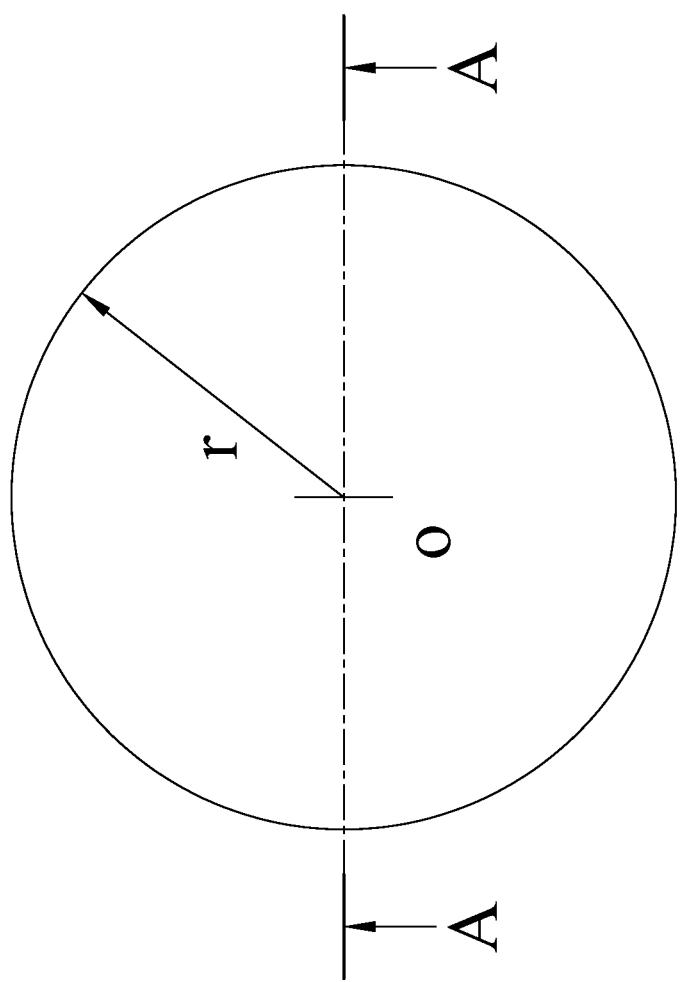
FIG. 7 shows a schematic view of a circular transmission coil.
Figure 8:
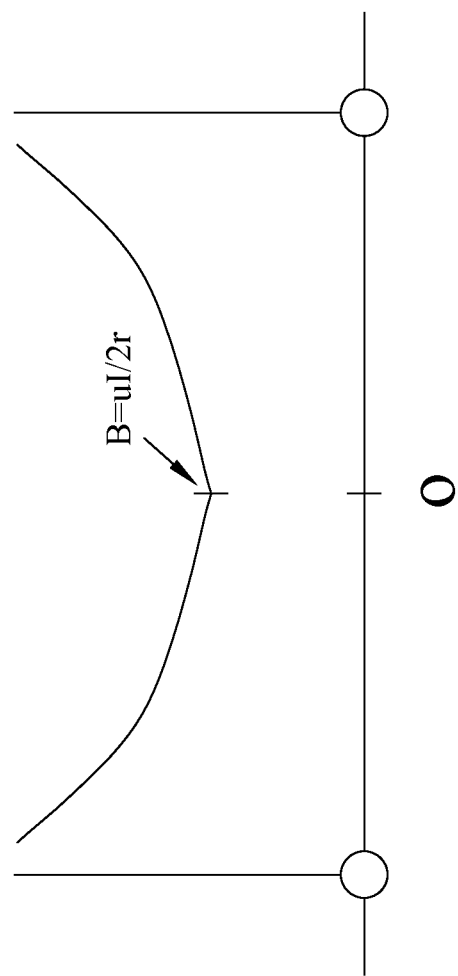
FIG. 8 shows a schematic view of magnetic field density corresponding to circular transmission coil of FIG. 7.

FIG. 7 shows a schematic view of a circular transmission coil, and FIG. 8 shows a schematic view of corresponding magnetic field density of FIG. 7. Center point O has a minimum magnetic field density, expressed as $$Bo = \frac{\mu_0 I}{2r}.$$

The magnetic field density measured with cross-section AA as the vertical axis is inversely distributed, and the theoretic values at points very close to the wires of transmission coil approach infinite (however, the Q-value of transmission coil can never be actual infinite), as shown in FIG. 8. Although the aforementioned description shows that the magnetic field density distributes more uniformly within the transmission coil than outside of transmission coil, center point O still shows a lower magnetic field than the points closer to points that are closer to the transmission coil. Therefore, the uniformity should be further enhanced to improve the system performance.

Figure 9:
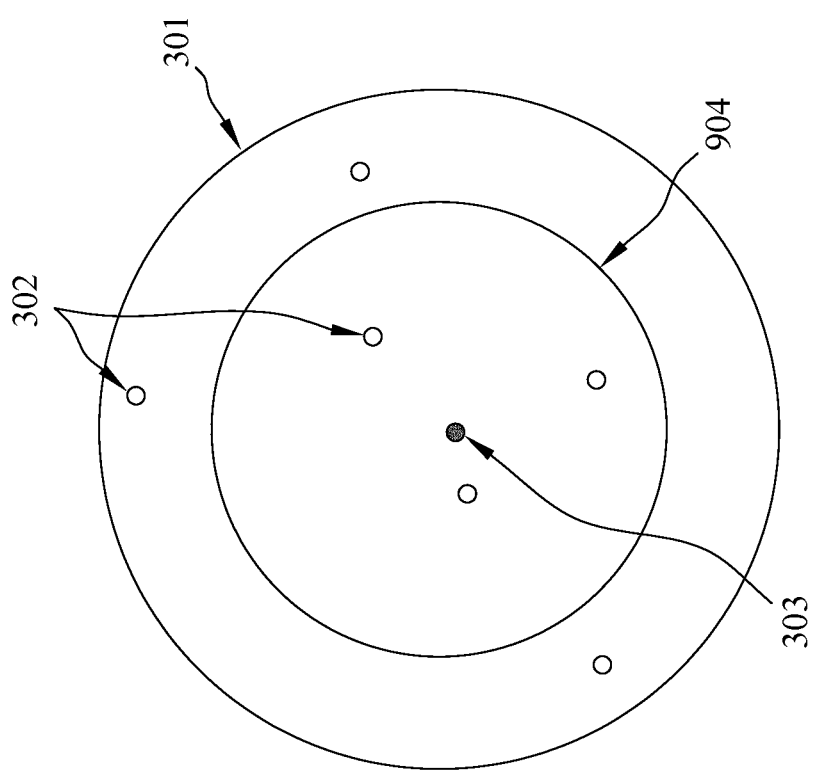
FIG. 9 shows a schematic view of another embodiment of a one-to-many wireless energy transmission system according to the present invention.

Assume that a high Q-value relay coil with characteristic dimension half of the characteristic dimension (r) of the transmission coil, i.e., ½r, is placed inside the transmission coil of FIG. 7 and the center point of the relay coil overlaps with center point O. FIG. 9 shows a schematic view of a second embodiment of the one-to-many wireless energy transmission system according to the present invention. As shown in FIG. 9, the system includes resonance transmission coil 301, at least a resonance receiving coil 302, and at least a controllable off tune relay coil 904. The at least a controllable relay coil 904 is placed within the work range of the resonance transmission coil, and the characteristic dimension, resonance frequency and placement location of the at least a controllable relay coil 904 are adjusted in accordance with the characteristic dimension and resonance frequency of resonance transmission coil 301 so that each of the at least a resonance receiving coil 302 can receive sufficient transmitted energy uniformly within the work range of the resonance transmission coil in order to operate normally without interference with each other.

Figure 10:
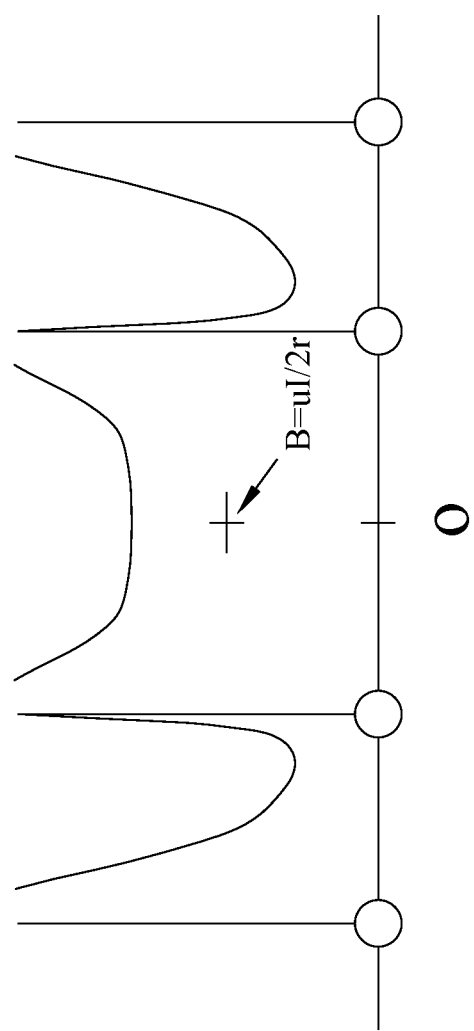
FIG. 10 shows a schematic view of magnetic field density distribution after adding a relay coil to the circular transmission coil of FIG. 7.

Because the relay coil will attract the nearby magnetic flux to the relay coil, the magnetic field density of the area surrounding the relay coil will be reduced and the magnetic field density of the relay coil will increase, and both still follow the inverse distribution, as shown in FIG. 10, where the arrow marks the original density value $B_0$. It is worth noting that, in FIG. 10, the magnetic field density outside of the relay coil is greatly reduced. That is, when a completely resonant, high Q-value relay coil is placed, the magnetic field density close to both sides of the relay coil may be lowered too much. If a load is added to the relay coil or a conductive wire with higher impedance is used for relay coil to reduce the Q-value, the capability to attract the magnetic flux can be reduced to prevent the magnetic field density close to both sides of the relay coil from being too low. However, the above solutions may increase energy-consuming load or coil impedance (equivalent of a load), the existence of the relay coil will affect the total energy absorption of the receivers within the work range, i.e., the overall system performance.

The solution of the present invention to the above situation is to use a high Q-value relay coil, but only adjust the resonance frequency to near the resonance frequency of the transmission coil, instead of identical. This approach is called "off tune".

When the resonance frequency of the relay coil is adjusted to be off the transmission coil frequency, the equivalent internal impedance of the relay coil will be reduced at that frequency (i.e., the equivalent internal impedance of a parallel resonance circuit is infinite at resonance frequency), and show pure capacitive or pure inductive impedance. The impedance will prevent the resonance from occurring, which is equivalent to reducing the Q-value of the relay coil and reducing the capability to attract magnetic flux. In addition, the use of off tune to reduce the Q-value of relay coil is very different from using a load or high impedance wire to form the relay coil. Because the impedance created by the off tune approach is pure capacitive or pure inductive, instead of ohmic loss as in the conventional approach. Hence, the off tune approach will neither affect the total energy absorption nor the system performance.

Figure 11:
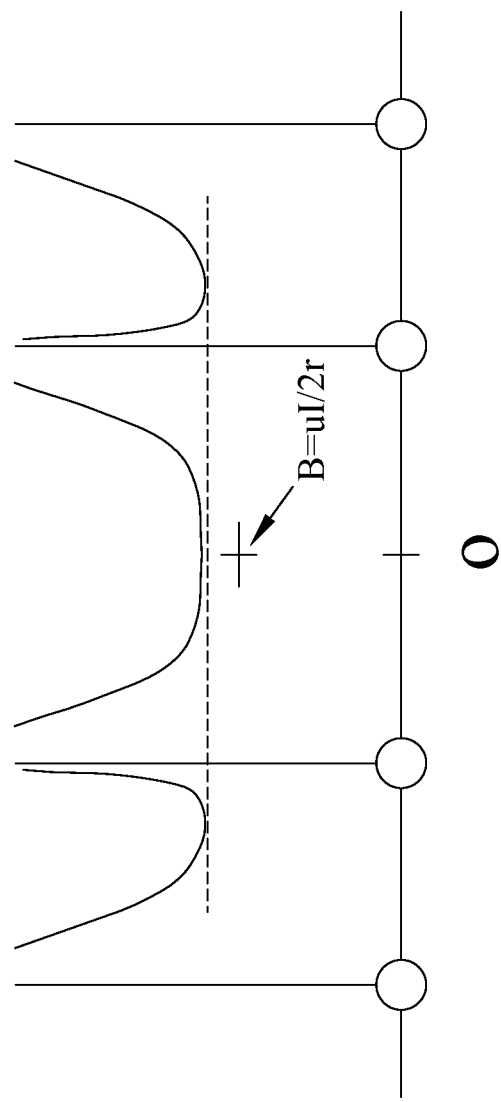
FIG. 11 shows a schematic view of magnetic field density distribution after off-tuning the relay coil of FIG. 9.

The guideline of controlling the resonance frequency of the relay coil is to make the magnetic field density at point O (the weakest point) to the magnetic field density at the weakest point outside of the relay coil. In fact, when adjusting the resonance frequency of the relay coil, the magnetic field density at point O (the weakest point) will change in reverse to the magnetic field density close to both sides of the relay coil. That is, when one is increasing, the other is decreasing; and vice versa. Therefore, there are only two frequency settings (i.e., to achieve pure capacitive or pure inductive impedance) can meet the demands of having the same magnetic field density within and outside of the relay coil. When the frequency of the relay coil is adjusted to an appropriate frequency, the magnetic field density will be as shown in FIG. 11. It is worth noting that when the off tune relay coil is added, the lowest magnetic field density (at the weakest point) is higher than the lowest magnetic field density (marked by the arrow in FIG. 11) when no relay coil is added.

Therefore, even though the off tune relay coil cannot increase the total absorbed energy by the receivers, the off tune relay coil can effectively improve the lowest magnetic field density and improve the overall uniformity of the magnetic field. Based on the previous analysis, the better uniformity the magnetic field has, the less the energy the transmission coil is required to transmit. In other words, the system performance is improved.

Another feature of the present invention is that each of the at least a resonance receiving coil can be selectively off tune, too. In a known magnetic field density, the receivers with larger characteristic dimension or higher Q-value will absorb more energy from the magnetic field to transform into electrical energy. Of course, the characteristic dimension and Q-value of receivers are often under certain physical constraints, such as, the area or the volume. When the characteristic dimension and Q-value of receivers are already tuned to the allowable constraint and yet unable to receive and transform sufficient energy for related subsequent circuits to function normally, the only solution by the conventional approach is to increase the transmission energy by the transmission coil.

On the other hand, if a resonance receiving coil of a receiver is designed to receive sufficient energy to maintain subsequent circuit functioning normally even at the weakest magnetic field. The resonance receiving coil will receive more energy than required, i.e., excessive, to maintain normal function when the resonance receiving coil is moved to a point with higher magnetic field density. The design of wireless energy transmission must take this into account because it might be dangerous for the subsequent circuit to directly absorb the excessive energy. In general, the conventional solution is to add an energy stabling circuit, such as, a constant-voltage, voltage-limiting or constant-current circuit. The energy stabilizing circuit absorbs and consumes the excessive energy from the resonance receiving coil in an ohmic loss manner. However, this approach is equivalent to waste energy of the system and affect the overall system performance as well as the energy absorbed by other resonance receiving coils. Hence, this design approach severely limits the total number of receivers allowable in the work range, and the operation stability of each of the receivers. In other words, the increase of overall transmission energy and the decrease of operation stability will severely impede the system performance.

Figure 12:
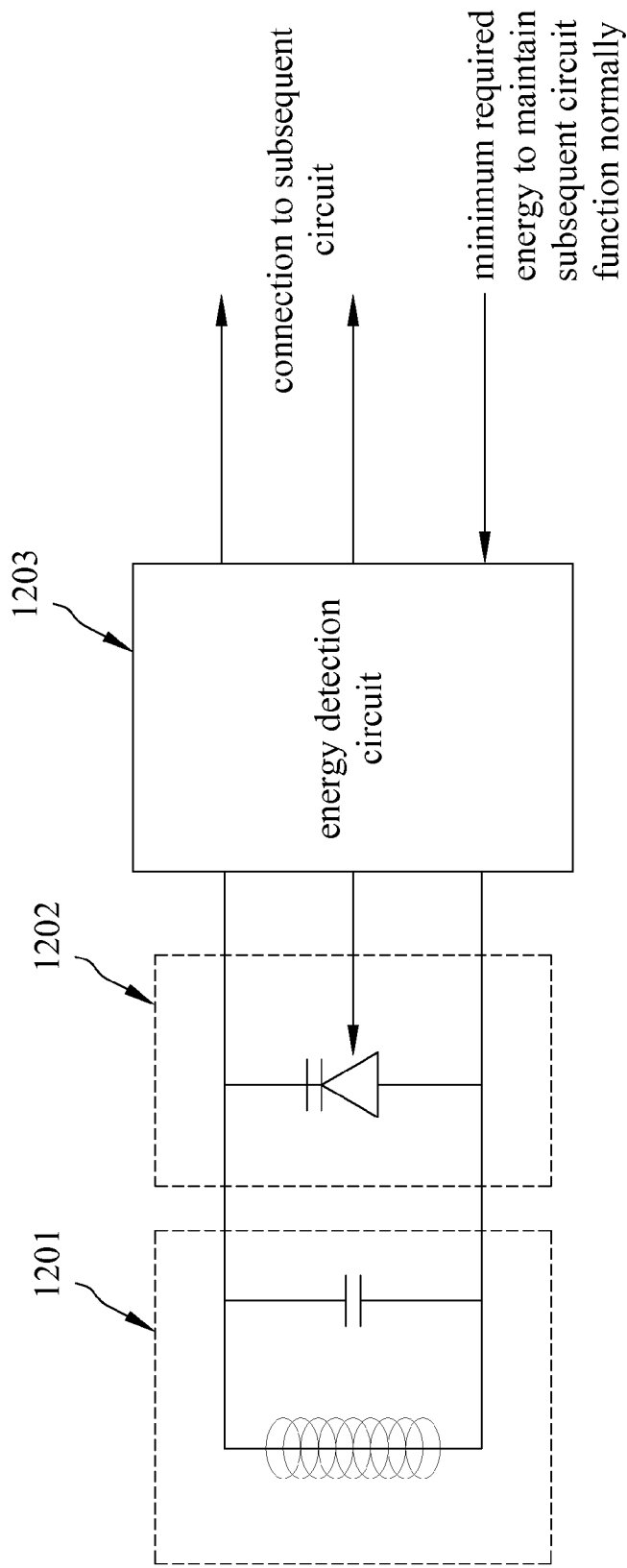
FIG. 12 shows a schematic view of using an energy detection circuit to control the off-tune of the resonance receiving circuit.

To overcome the disadvantages of conventional approach, the present invention add a power detection circuit between the receiver with the resonance receiving coil and its subsequent circuit. The energy detection circuit has a feedback signal connected to the resonance frequency control element of the resonance receiving coil. As shown in FIG. 12, resonance receiving circuit 1201 and resonance frequency control element 1202 of resonance receiving coil are connected in parallel, and energy detection circuit 1203 is located between resonance receiving circuit 1201 and a subsequent circuit. Energy detection circuit 1203 further provides a feedback signal to resonance frequency control element 1202 of resonance receiving coil. Energy detection circuit 1203 receives a signal indicating the minimum required energy from the subsequent circuit and generates the feedback signal to control resonance frequency control element 1202 of resonance receiving coil. When energy detection circuit 1203 detects that the energy received by resonance receiving circuit 1201 is more than the required energy to maintain the subsequent circuit function normally, energy detection circuit generates a suitable feedback signal to resonance frequency control element 1202 of resonance receiving coil. Then, resonance frequency control element 1202 of resonance receiving coil adjusts resonance receiving circuit 1201 to drift from the original resonance frequency, i.e., off tune. The theory is similar to the controllable off tune relay coil described earlier. When the resonance frequency of resonance receiving circuit 1201 is adjusted to a different frequency from the resonance frequency of transmission coil, the equivalent internal impedance of resonance receiving circuit 1201 will be reduced at that frequency (the equivalent internal impedance of parallel resonance circuit is infinite at resonance frequency) and shows pure capacitive or pure inductive impedance. The pure capacitive or pure inductive impedance prevents the resonance from occurring and in equivalence reduces the Q-value of resonance receiving circuit 1201 so that the capacity resonance receiving circuit 1201 to absorb energy from the magnetic field is reduced. Because resonance frequency control element 1202 is pure capacitive or pure inductive, no actual ohmic loss is involved. Hence, the total energy able to be absorbed by other receivers is not affected. The reduction of the capability resonance receiving circuit 1201 to absorb the energy from the magnetic field will lead to the reduction of the electrical energy transformation. Therefore, by controlling the parameters of the energy detection circuit 1203 appropriately, the receivers can be controlled to absorb only minimum required energy for the subsequent circuit to function normally while limiting the effect on other receivers.

Figure 13:
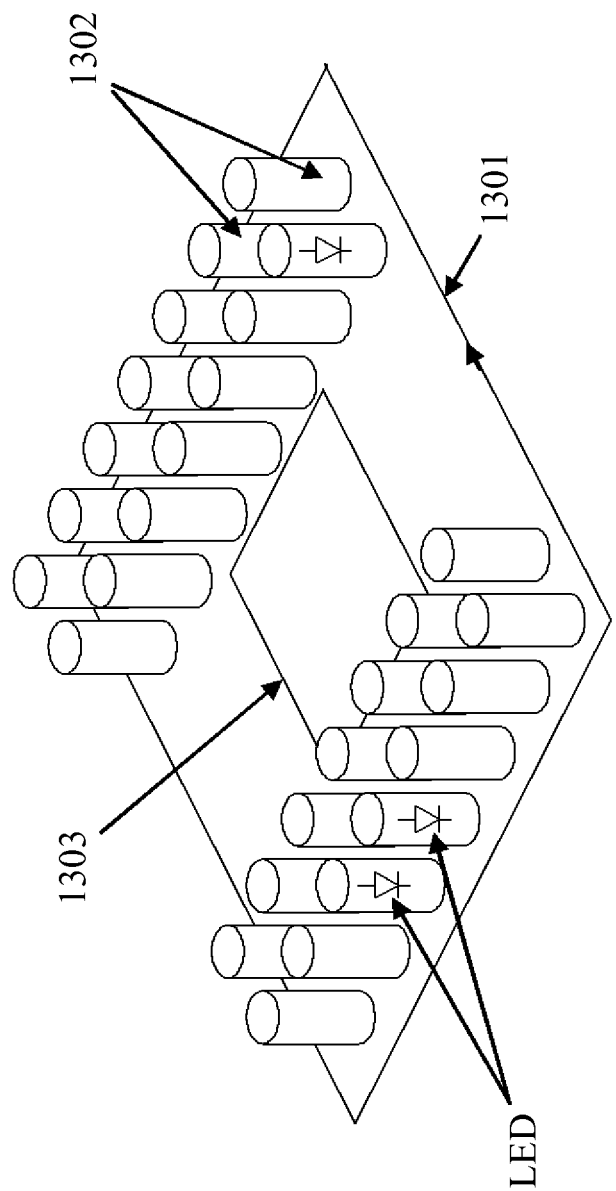
FIG. 13 shows a schematic view of an actual application of the present invention.

FIG. 13 shows a schematic view of an application of the present invention. As shown in FIG. 13, the application is a luminous international chess set. The luminous chess pawns are lighted via wireless energy transmission system of the present invention. The chess set includes a chess board and a plurality of pawns, where the chess board has a transmission coil 1301 and a controllable off tune relay coil 1303, and each of the plurality of pawns is a controllable off tune resonance receiver 1302. Controllable off tune resonance receiver 1302 further includes a subsequent circuit having at least an LED.

As shown in FIG. 13, transmission coil 1301 covers the entire chess board area (i.e., work range) and the relay coil 1303 within the chess board improves the magnetic field uniformity and reduces the required transmission energy to maintain good system performance. The work range of transmission coil 1301 can at least accommodate 32 pieces of pawns, which is defined by the standard international chess set. Each pawn is an independent receiver, and includes the aforementioned energy detection circuit and resonance frequency control element to achieve the aforementioned controllable off tune feature to maintain the independence of each pawn piece and improve the system efficiency. Each pawn piece further includes appropriate number of LEDs for indication and aesthesis purpose. The transmitter encompassing the transmission coil can further include a transmission power controller to provide manual or automatic detection feedback control so that the final transmission power can be minimized to only provide energy sufficient for each of piece pawn to absorb required energy when all pawn pieces are on the chess board.

FIG. 13 shows only one of the many possible applications of the present invention. In addition to chess set, the one-to-many wireless energy transmission system of the present invention can also be applied to many types of board games, such as, jigsaw puzzle, card game platform, monopoly, other two-dimensional game platforms, and so on. In addition, as aforementioned, the one-to-many wireless energy transmission system of the present invention can also be used to realize a three-dimensional uniform magnetic field; thus, the present invention can also be used to realize three-dimensional games, such as, jenga, lego, blocking blocks, or other educational material. Furthermore, in addition to LED, the subsequent circuit can also provide functions for voice or other visual effects.

In summary, the present invention has the following advantages in comparison with the conventional technique:
1. Provide a work range of magnetic field with high uniformity to effectively reduce the total amount of energy required to transmit and improve the system performance.
2. A plurality of receivers can work independently and absorb only minimum required energy to maintain subsequent circuit function normally without affecting other receivers.
3. The structure is simple and is applicable to generate two-dimensional or three-dimensional magnetic field with good work range uniformity. The applications will be easy to manufacture and commercially viable.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A one-to-many wireless energy transmission system, comprising:
   at least a resonance receiving coil; and
   a resonance transmission coil having a resonance frequency and using a characteristic dimension to indicate a work range, said work range covering an area or volume larger than or equal to the total area or volume of each of said at least a resonance receiving coil, a magnetic field density within said work range of said resonance transmission coil having sufficient uniformity for each of said at least a resonance receiving coil to uniformly receive a minimum required energy to function normally without interfering each other regardless of locations within said work range;
   wherein each of said at least a resonance receiving coil is further connected in parallel with a resonance frequency control element and an energy detection circuit is connected between the resonance receiving coil and a subsequent circuit; said energy detection circuit receives a signal indicating said minimum required energy from said subsequent circuit and generates a feedback signal to control said resonance frequency control element to off-tune the resonance receiving coil so as to reduce resonance-receiving capability of the resonance receiving coil to only receive said minimum required energy to operate independently and not interfering with each other.

2. The system as claimed in claim 1, wherein said minimum required energy is the energy required to maintain said subsequent circuit to function normally.

3. A one-to-many wireless energy transmission system, comprising:
   at least a resonance receiving coil;
   a resonance transmission coil having a resonance frequency and using a characteristic dimension to indicate a work range, said work range covering an area or volume larger than or equal to the total area or volume of each of said at least a resonance receiving coil, a magnetic field density within said work range of said resonance transmission coil having sufficient uniformity for each of said at least a resonance receiving coil to uniformly receive a minimum required energy to function normally without interfering each other regardless of locations within said work range; and
   at least a controllable relay coil being placed within said work range of said resonance transmission coil, and characteristic dimension, resonance frequency and placement location of said at least a controllable relay coil being adjusted in accordance with the characteristic dimension and resonance frequency of said resonance transmission coil so that each of said at least a resonance receiving coil is able to receive sufficient transmitted energy uniformly within said work range of said resonance transmission coil.

4. The system as claimed in claim 3, wherein said resonance frequency of said controllable off tune relay coil is close to and yet slightly off said resonance frequency of said resonance transmission coil, but not identical to said resonance frequency of said resonance transmission coil.

5. The system as claimed in claim 3, wherein a center point of said controllable off tune relay coil overlaps the center point of said resonance transmission coil, said controllable off tune relay coil and said resonance transmission coil have a similar shape, and a distance from said controllable off tune relay coil to said center point is half of the distance from said resonance transmission coil to said center point.

6. The system as claimed in claim 3, wherein said controllable off tune relay coil has a high Q-value.

7. The system as claimed in claim 3, wherein said system is applied to a two-dimensional game platform with wireless energy transmission system.

8. The system as claimed in claim 7, wherein said two-dimensional game platform with wireless energy transmission system is an international chess set.

9. The system as claimed in claim 7, wherein said two-dimensional game platform with wireless energy transmission system is a jigsaw puzzle.

10. The system as claimed in claim 7, wherein said two-dimensional game platform with wireless energy transmission system is a card game platform.

11. The system as claimed in claim 7, wherein said two-dimensional game platform with wireless energy transmission system is a monopoly board game.

12. The system as claimed in claim 3, wherein said system is applied to a three-dimensional game platform with wireless energy transmission system.

13. The system as claimed in claim 12, wherein said three-dimensional game platform with wireless energy transmission system is a jenga set.

14. The system as claimed in claim 12, wherein said three-dimensional game platform with wireless energy transmission system is a lego set.

15. The system as claimed in claim 12, wherein said three-dimensional game platform with wireless energy transmission system is a building block set.

* * * * *